Sept. 8, 1959  G. W. BECK ET AL  2,902,732
WEATHERSTRIP RETAINING CLIP
Filed Nov. 15, 1956

INVENTORS
George W. Beck,
William E. Sehn &
Walter Ziffer
BY
W. Pettigrew
ATTORNEY United States Patent Office 2,902,732
Patented Sept. 8, 1959

2,902,732
WEATHERSTRIP RETAINING CLIP

George W. Beck, Dayton, Ohio, William E. Sehn, Highland Park, Mich., and Walter Ziffer, Dayton, Ohio, assignors to General Motors Corporation, Detroit, Mich., a corporation of Delaware Application November 15, 1956, Serial No. 622,363

2 Claims. (Cl. 20—69)

This invention relates to weatherstrips and more particularly to applied fasteners for securing weatherstrips to suitable supporting structures.

The invention as disclosed herein is directed to weatherstrips of the general type shown in U.S. Patent 2,579,072 Harris, assigned to the assignee of this invention, in which a latex foam strip, compounded and cured in a mold providing a desired cross-sectional shape, has molded therein a zig-zag reinforcement wire. The wire includes spaced intergral portions which protrude from the latex strip. These portions are so formed as to effect snap-in engagement with apertures formed in sheet metal body work and the like.

In certain applications it is necessary to apply such weatherstrips over body parts which are extraordinarily thick or for other reasons do not readily adapt themselves for snap-in engagement of the wire protuberances, as for example, the relatively heavy die cast CV window frame structure. In the past in order to effect firm engagement of the weatherstrip in such localized areas, it has been the practice to strip the latex foam from the zig-zag wire at spaced intervals along the length thereof overlying the thickened attachment surface. Each protuberance in the stripped area was then bent at right angles to the plane of the protuberances in the unstripped area. A special auxiliary reinforcing clip was then secured to the stripped wire parallel with the bent protuberance and the weatherstrip remolded to replace the previously removed rubber. Such reinforcing clips were then secured to the thickened body portion by sheet metal screws or the like.

An object of the present invention is to provide a weatherstrip of the type heretofore described wherein portions of the weatherstrips which lie adjacent structural members of thickened cross section are provided with auxiliary applied fastening means which are self-engaging with the embedded reinforcing wire.

Another object is to provide a weatherstrip of the type described in combination with an auxiliary fastener adapted for physical connection with the embedded reinforcing wire without removal of the surrounding latex material.

Still another object is to provide a weatherstrip assembly for a vehicle door or similar type of closure member including applied fasteners associated with the integral fasteners of the wire reinforcement which include tab portions extending outwardly from said strip in a plane normal to the plane including the remainder of the integral fasteners.

These and other objects, advantages and features of the invention will become more fully apparent as reference is had to the accompanying specification and drawings wherein.

Figure 1:
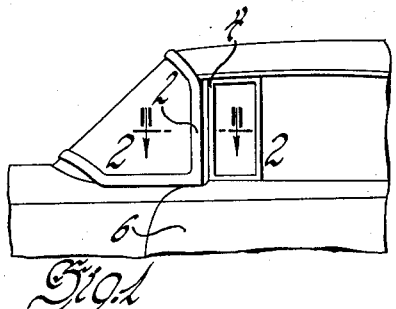
Fig. 1 is a fragmentary side elevational view of a portion of a vehicle body illustrating the general area in which the invention is applied.
Figure 2:
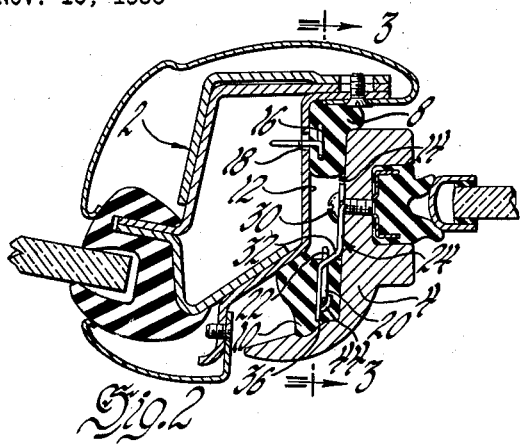
Fig. 2 is a transverse sectional view looking in the direction of arrows 2—2 of Fig. 1.
Figure 3:
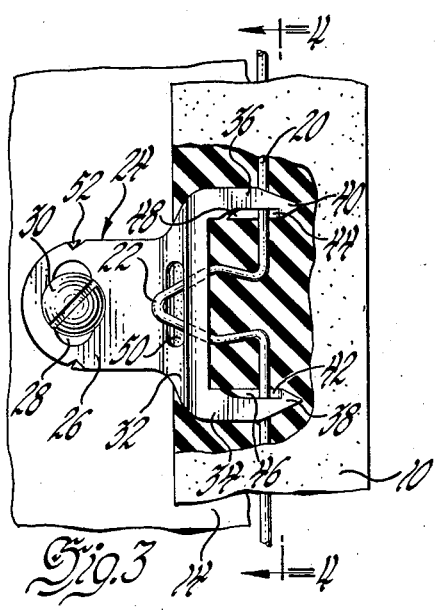
Fig. 3 is an enlarged elevational view, partly in section, showing the form and arrangement of the invention in assembled relation.
Figure 4:
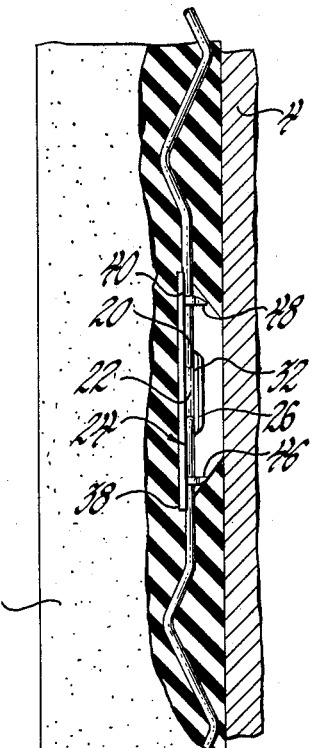
Fig. 4 is an enlarged fragmentary view, partly in section, looking in the direction of arrows 4—4 of Fig. 3.

Referring now to the drawings, Fig. 1 illustrates generally the forward upper portion of a vehicle body in which the reference numeral 2 designates generally a vertical windshield side pillar. Spaced immediately rearwardly from pillar 2 is a die cast CV window frame 4 which is secured to vehicle body door 6. CV frame 4 is rigidly mounted on door 6 and swings outwardly therewith in the conventional manner. As seen best in Fig. 2, a pair of laterally spaced vertically extending weatherstrips 8 and 10 are disposed between the rearwardly facing surface 12 of pillar 2 and the forwardly facing surface 14 of CV frame 4. Weatherstrip 8 is a conventional latex foam strip having molded therein a reinforcement wire 16 which at spaced intervals has bent portions protruding outwardly from the latex material for snap-in engagement with cooperating spaced apertures 18 formed in wall 12. Weatherstrip 10 is basically similar to weatherstrip 8 in that it also includes an embedded reinforcement wire 20 which at spaced intervals has integral protruding bent portions 22 which extend outwardly from the latex material. However, because of the relatively great cross sectional thickness of CV frame 4, the latter does not readily lend itself to snap-on retention of weatherstrip 10 in the manner utilized in connection with weatherstrip 8.

Figure 5:
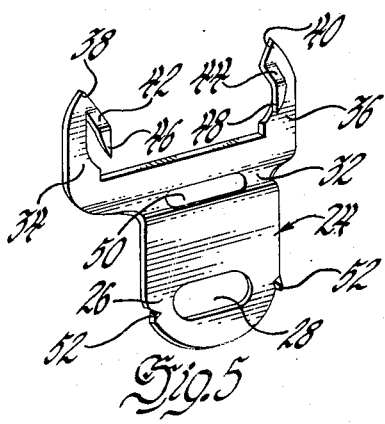
Fig. 5 is an enlarged perspective view of the applied fastener embodied in the present invention.

To secure weatherstrip 10 to CV frame 4 in accordance with the present invention, each of the integral wire protuberances 22 lying adjacent CV frame 4 are bent at right angles to the plane of the protuberances in the remainder of the strip. In order to connect weatherstrip 10 to the adjacent section of CV frame 4, a sheet metal fastener 24 is provided which is adapted for manual insertion in weatherstrip 10 and affords interlocking engagement with embedded portions of reinforcement wire 20. As seen best in Fig. 5, fastener 24 is formed of relatively thin sheet metal and has an outer tab portion 26 in which is formed an elongated aperture 28. Aperture 28 is adapted to receive a self-tapping or other suitable machine screw 30 which, in turn, threadably connects with CV frame 4. Intermediately of its length, fastener 24 is bent at substantially right angles to the plane of tab 26 to form a shoulder 32. The inner end of fastener 24 is reversely bent to form a pair of laterally spaced legs 34 and 36 which lie in a plane parallel with the tab 26. At their forward extremities, legs 34 and 36 are profiled to form forwardly extending barbs 38 and 40 which permit pressure penetration of the latex body of weatherstrip 10. The inner opposed edges of legs 34 and 36, in turn, are lanced to provide rearwardly extending legs 42 and 44 which are struck outwardly and reversely bent so as to lie in a plane parallel with the plane of legs 34 and 36. The rearward extremities of legs 42 and 44 are profiled to form barbs 46 and 48. Centrally of the intermediate shoulder portion 32 there is formed an elongated aperture 50, the purpose of which will be described shortly. In utilizing the invention, fastener 24 is pressure inserted into the latex body of weatherstrip 10 until the points of reverse barbs 46 and 48 extend beyond the portions of wire reinforcement body 20 adjacent a protuberance 22. During insertion of barbs 46 and 48, wire protuberance 22 progressively enters elongated slot 50 in shoulder 32 so that, in assembled position, fastener 24 is relatively rigidly retained in a plane parallel with protuberance 22. To complete the assembly, fastener 24 is then pulled outwardly from wire body 20 so that the latter is snagged between legs 34 and 42 and legs 36 and 44. Because the latex body resiliently engages the intermediate shoulder portion 32, the former tends to urge fastener 24 away from wire body 20, hence the snagging action of legs 34 and 42 and 36 and 44 has no tendency to disengage.

In order to improve gripping engagement of fastener 24 on CV frame 4, the perimeter of tab portion 26 of fastener 24 is preferably formed with a plurality of notched barbs 52 which effect biting engagement with the CV frame when machine screw 30 is tightened.

From the foregoing it will be seen that a novel and simplified auxiliary attachment fastener has been provided. A weatherstrip assembly according to the present invention not only obviates the necessity of remolding the weatherstrips as heretofore required, but in addition permits relocation of the initial assembly position, addition of any number of fasteners after fabrication of the weatherstrip, and rigid replacement of damaged or broken parts.

While but one embodiment of the invention has been shown and described, it will be evident that other changes and modifications may be made therein. It is, therefore, to be understood that it is not intended to limit the invention to the embodiment shown, but only by the scope of the claims which follow.

We claim:

1. In combination, a weather strip comprising a resilient body having molded therein a reinforcement member formed with at least one closed loop extending out of a side of said body, and a sheet metal fastener comprising an outer tab portion, an inner end portion having a pair of laterally spaced forwardly directed legs inserted into said resilient body on opposite sides of said loop, said tab portion having a generally planar body lying in a plane generally parallel with the common plane of said forwardly directed legs, an intermediate portion connecting said tab and end portions, said intermediate portion having a slot formed therein and receiving said loop, and a pair of rearwardly directed legs formed near the forward ends of said forwardly directed legs, the free ends of said rearwardly directed legs being offset from said forwardly directed legs to form yokes which surround portions of said reinforcement member in said weather strip.

2. In combination, a weather strip comprising a resilient body having molded therein a reinforcement wire formed with spaced loop portions extending out of a side of said body, and a sheet metal fastener comprising an outer planar tab portion having a screw-receiving aperture formed centrally therein, the outer perimeter of said tab being lanced to provide a plurality of anti-turn barbs, an inner end portion having a pair of laterally spaced forwardly directed legs inserted into said resilient body on opposite sides of said loop, said tab portion lying in a plane generally parallel with the common plane of said forwardly directed legs, an intermediate portion connecting said tab and end portions, said intermediate portion having a slot formed therein and receiving said loop, and a pair of rearwardly directed legs formed near the forward ends of said forwardly directed legs, the free ends of said rearwardly directed legs being offset from said forwardly directed legs to form yokes which surround portions of said reinforcement member in said weather strip.

References Cited in the file of this patent

UNITED STATES PATENTS

| | | |
|---|---|---|
| 1,022,745 | Kurz | Apr. 9, 1912 |
| 2,065,525 | Hamilton | Dec. 29, 1936 |
| 2,229,335 | Moorman | Jan. 21, 1941 |
| 2,720,685 | Harris | Oct. 18, 1955 |
| 2,740,179 | Flora | Apr. 3, 1956 |
| 2,787,033 | Peckham et al. | Apr. 2, 1957 |